March 16, 1971  F. J. ARMSTRONG ET AL  3,570,116
METHOD OF ASSEMBLING AN ELECTRIC MOTOR HAVING
SPEED INDICATING MEANS
Original Filed April 27, 1967  2 Sheets-Sheet 1
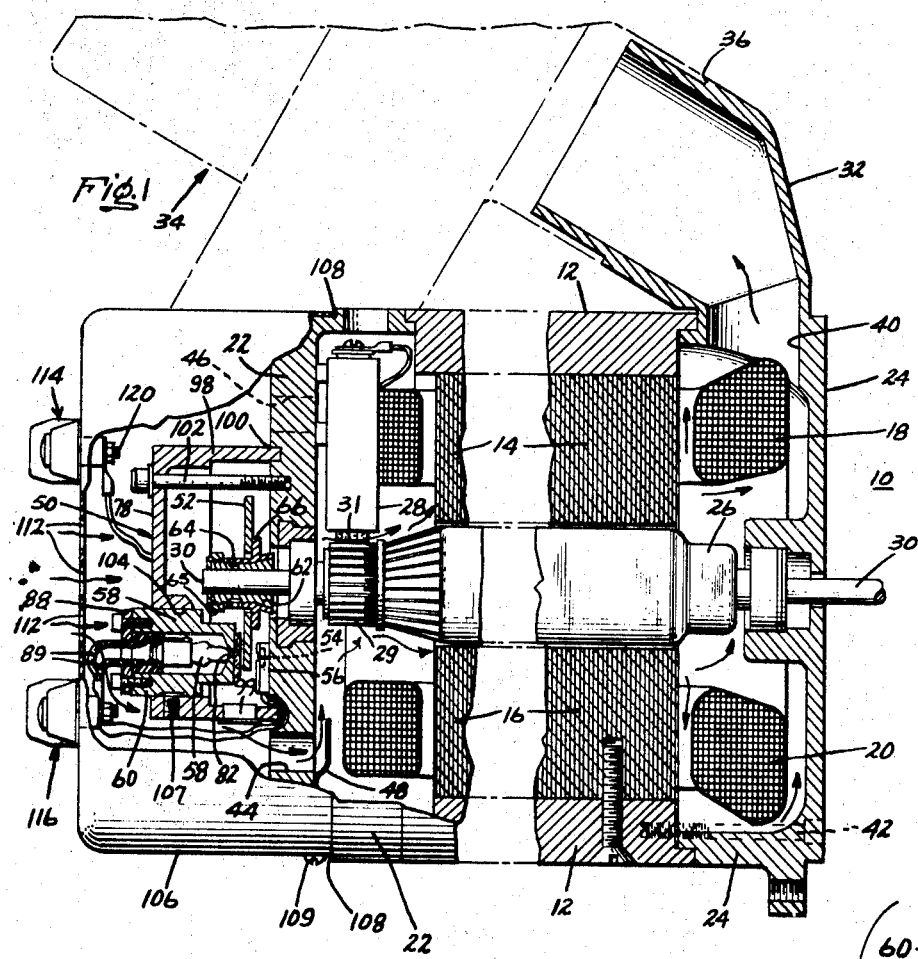
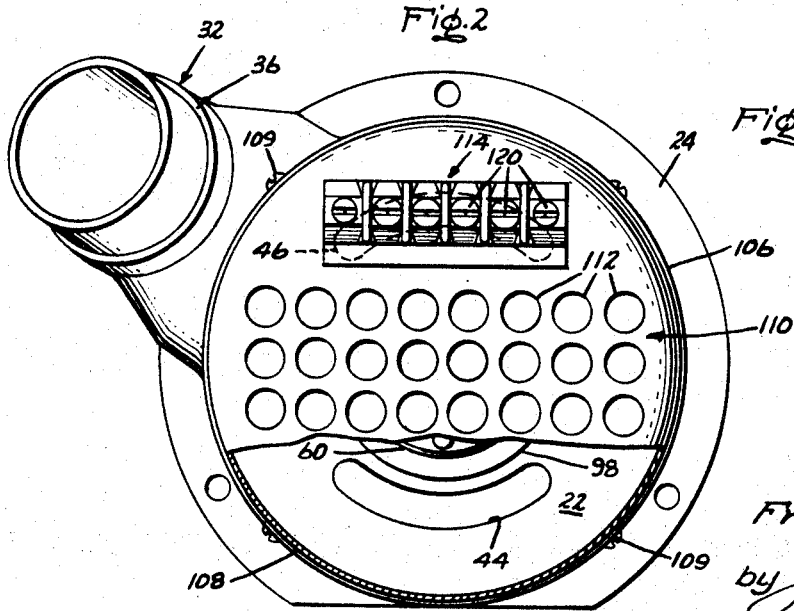
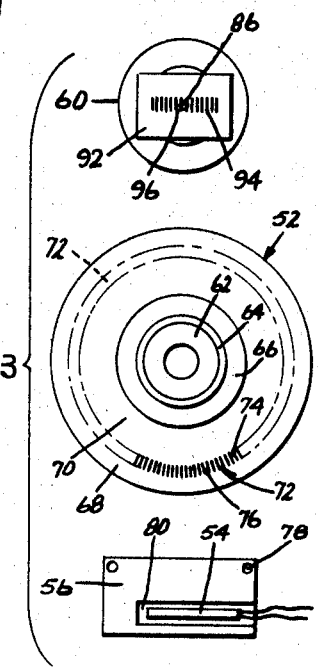
Inventors:
Fredrick J. Armstrong,
Robert A. Susdorf,
by John M. Cloudt
Attorney.

March 16, 1971   F. J. ARMSTRONG ET AL   3,570,116
METHOD OF ASSEMBLING AN ELECTRIC MOTOR HAVING
SPEED INDICATING MEANS
Original Filed April 27, 1967   2 Sheets-Sheet 2
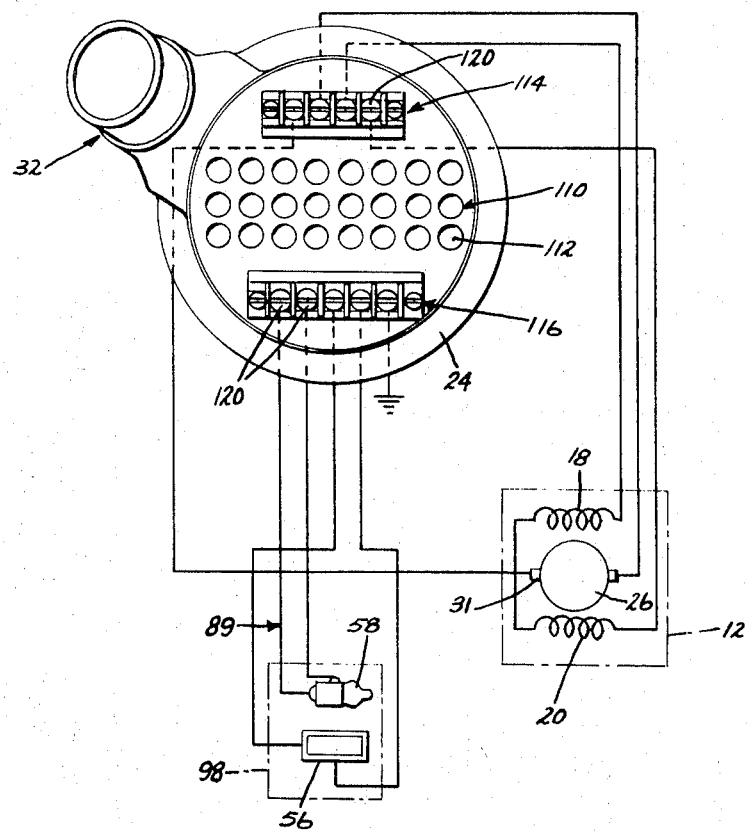
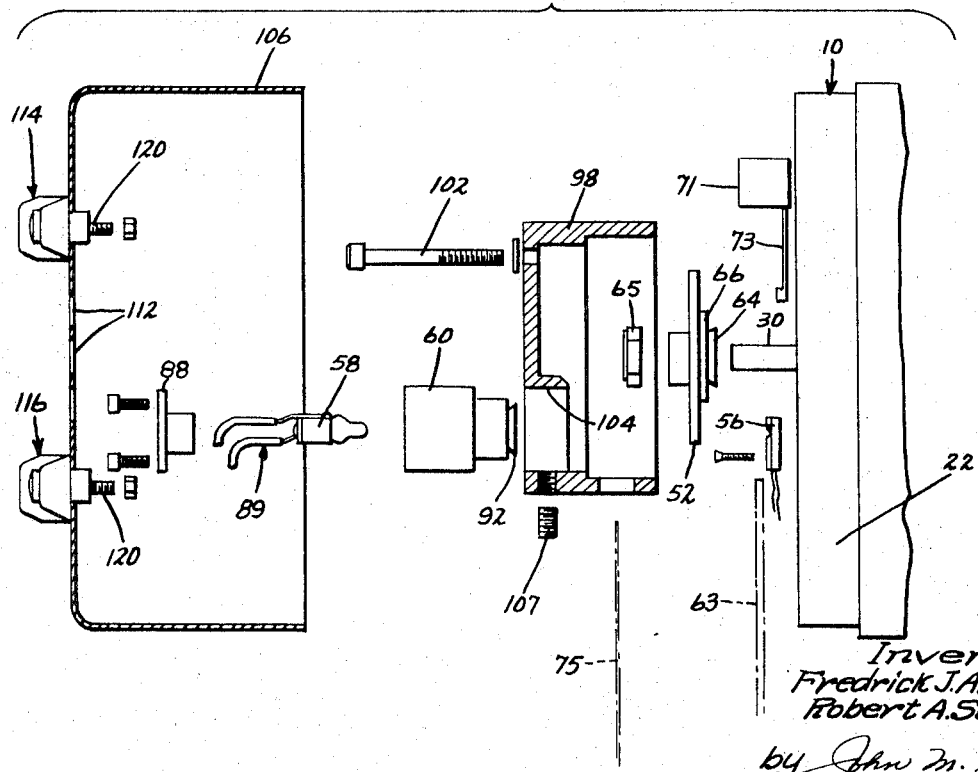
Inventors:
Fredrick J. Armstrong,
Robert A. Susdorf,
by John M. Stoudt
Attorney.

United States Patent Office 3,570,116
Patented Mar. 16, 1971

3,570,116
METHOD OF ASSEMBLING AN ELECTRIC MOTOR HAVING SPEED INDICATING MEANS
Fredrick J. Armstrong and Robert A. Susdorf, Fort Wayne, Ind., assignors to General Electric Company
Original application Apr. 27, 1967, Ser. No. 634,183, now Patent No. 3,465,184, dated Sept. 2, 1969. Divided and this application Feb. 3, 1969, Ser. No. 797,380
Int. Cl. H02k 15/00
U.S. Cl. 29—596     4 Claims

ABSTRACT OF THE DISCLOSURE

The assembly method includes steps generally directed to mounting and aligning the speed indicating assembly components on the motor and electrically connecting various motor and speed indicating assembly components to sections of a terminal board carried by an enclosure member.

CROSS-REFERENCE TO RELATED APPLICATION

This application is a division of our co-pending U.S. application, Ser. No. 634,183, now Pat. No. 3,465,184, filed Apr. 27, 1967.

BACKGROUND OF THE INVENTION

This invention relates generally to dynamoelectric machines, for example electric motors, and more specifically to an improved method of assembling electric motors having rotatable assemblies and speed indicating means incorporated therein.

Since the advent of computer equipment, there has been a demand for special purpose dynamoelectric machines in the form of electric motors for use with this equipment. In one application these motors are needed for driving capstans in order to transport programmed tape in the computers themselves, and in other applications in certain peripheral equipment, such as high speed printers, disc packs and the like. One common requirement for electric motors used in these applications is that the motor accelerate rapidly and that the running speed be substantially constant. Thus, at the present time, for example, motors used for driving capstans normally should come up to running speed in not more than five milliseconds and preferably less, and the running speed should ordinarily not vary more than 1 to 2 percent, since it is extremely important that the programmed tape be moved past the tape reader or head at nearly constant speed.

One such special purpose electric motor capable of use, among other applications, in computer equipment is disclosed and claimed in our co-pending U.S. Pat. application Ser. No. 634,183, filed Apr. 27, 1967, and assigned to the same assignee. As will be seen in detail in that application, the machine is a direct current type electric motor having a wound field and a low inertia armature assembly having a commutator and windings carried on the periphery of a magnetic core. This motor has been found to be acceptable both as to performance and quality in various computer equipment applications. It would be additionally desirable, however, to provide motors for such applications with a construction for fluid cooling the motor components, such as the wound field and commutation parts. Furthermore, it would be highly advantageous to furnish an inexpensive yet effective arrangement for indicating the rotational speed of the armature assembly to enable the speed of the motor to be precisely controlled for certain applications.

Accordingly, it is a primary object of this invention to provide an improved method of assembling an electric motor having speed indicating means whereby a high quality accurately constructed motor having a precisely controlled speed is possible.

A further object of this invention is to provide an improved method particularly effective in assembling an air cooled electric motor having a low inertia armature assembly and armature speed indicating means wherein the rotational speed can be held substantially constant within 1 to 2 percent.

In accordance with one form of our invention, we provide an improved method of assembling an electric motor having speed indicating means. In the illustrated embodiment, the motor has a stationary assembly having a frame including a housing and a field winding. It also has first and second end frames or shields and a rotatable assembly in the form of a low inertia armature assembly rotatably carried between the end shields, with the armature shaft extending through at least one of the end shields. A speed indicating assembly is provided, including an optical disc mounted on an extension of the shaft exteriorly of the motor housing, a light sensing device or photo-cell mounted on a first end shield generally adjacent one side of the disc, and a cover enclosing the disc and photo-cell and having a light source which is located generally adjacent the other side of the disc.

In assembling this motor the end shields are mounted on the motor housing, with the armature between the end shields. The photo-cell is then affixed to the exterior face of one end shield and the optical disc is located on the armature shaft adjacent to and at a preselected distance from the photo-cell. The optical disc has an annular track which is aligned to maintain the eccentricity thereof with respect to the axis of rotation of the disc and armature shaft within 2 mils in one application. The disc is also aligned to maintain a maximum of 1 mil total axial movement of the track during rotation of the disc. A cover member is then attached to the one end shield, enclosing the disc and photo-cell, and a light source having a grid plate including alternating opaque sections and light transmitting sections or windows is mounted in the cover member, with the grid plate being a preselected distance from the disc. The windows on the disc track and the grid plate are aligned and the grid plate affixed with respect to the cover member to maintain this alignment. An outer, perforated enclosure member having at least one terminal board thereon is then mounted on the one end shield.

Among other advantages, the speed indicating assembly of the exemplified motor provides an extremely accurate output signal, the frequency of which is proportional to the speed of rotation of the armature shaft, thereby enabling the speed of rotation to be precisely controlled. In actual practice, the photo-cell is electrically connected to an amplifier and comparator circuit and the output signal of the photo-cell, which is indicative of the rotational speed of the armature shaft, is compared to a reference signal. The motor may then be energized or deenergized in order to maintain the rotational speed of the armature assembly substantially constant (for instance, within 1 to 2 percent for one application). Since any inaccuracies in the mechanical mounting or positioning of the various speed indicating components will be greatly magnified in the amplified and comparator circuit, it is extremely important to minimize or even eliminate such inaccuracies during fabrication and assembly of the present motor. The exemplified method of assembly, together with the preferred motor components, enable such adjustments to be made for insuring the production of a high quality, accurately constructed motor, the speed of which may be precisely controlled.

The subject matter which we regard as our invention is set forth in the appended claims, the invention itself, however, together with further objects and advantages thereof may be better understood by referring to the following description taken in conjunction with the accompanying drawings.

BRIEF DESCRIPTION OF THE DRAWINGS

FIG. 1 is an elevational view of an electric motor assembled by the preferred form of this invention, with parts broken away and parts in section illustrating improved air cooling and speed indicating assembly features of the motor;

FIG. 2 is an end elevational view, with parts broken away in order to further illustrate the air cooling arrangement of the motor shown in FIG. 1;

FIG. 3 is an elevational view of several components included in the speed indicating assembly illustrated in the motor of FIGS. 1 and 2;

FIG. 4 is a schematic circuit diagram showing the connections of various motor components to the terminal boards illustrated in FIGS. 1 and 2; and FIG. 5 is an exploded view of a portion of the motor shown in FIGS. 1 and 2 further illustrating the preferred method of assembling the motor.

DESCRIPTION OF THE PREFERRED EMBODIMENTS

Referring now to the drawings in greater detail, and particularly to FIGS. 1 and 2, we have illustrated on exemplified dynamoelectric machine in the form of a direct current electric motor 10 having a stationary assembly including a housing 12, a wound field or stator including, in the exemplification, first and second magnetic poles 14 and 16 carrying wound field coils 18 and 20 respectively. Although in the exemplification we have shown a two-pole electric motor, it will be appreciated that the method of the present invention may readily be used to construct electric motors having more than two poles, in alternating current type motors, or in motors having a wound or permanent magnet field if so desired.

The motor 10 in the illustrated exemplification additionally includes first and second end frames or shields 22 and 24 having conventional ball bearings located therein for rotatably mounting a rotatable assembly in the illustrated form of an armature assembly 26 therebetween. The armature assembly 26 includes a commutator 28 at one end, and an armature shaft 30 which extends through the end shields 22 and 24 and exteriorly of the motor housing 12. For purposes of disclosure the illustrated rotatable assembly shown herein is more fully described in greater detail and claimed in the aforementioned co-pending application of which we are co-inventors. The motor 10 also includes a pair of brush holders 29 (only one of which is illustrated) integrally molded, in this case, on the end shield 22 and carrying the usual brushes 31.

The end shield 24 includes an integrally formed hollow tubular projection 32 adapted to receive either an air exhaust or an air forcing fan arrangement. In actual practice, we have utilized an air exhaust fan 34 which is mounted upon a reduced portion or seat 36 at the end of the tubular projection 32 in substantially air-tight relationship therewith for drawing cooling fluid such as air through the motor 10. In order to facilitate the drawing of air through the motor for cooling purposes, the tubular projection 32 opens to an airflow path through the motor 10, partially formed by a channel 40 in the end shield 24 and including the open space in the motor housing between the poles 14 and 16 and between the housing wall and the armature. As will be seen in FIG. 1 in particular, the end shield 24 is mounted to the motor housing 12 by an overlapping connection, and is normally fastened to the housing 12 by suitable mounting means such as mounting bolts 42 or the like.

In order to complete the airflow path through the motor, the other end shield 22 is provided with a pair of air vents or openings 44 and 46 therethrough, the air vents being located on opposite sides of and generally equally spaced from the radial center of the end shield 22. In addition, curved air deflectors 48 (only one of which is shown) are located on the inner side of the end shield 22 adjacent to the air vents 44 and 46 for directing or guiding the flow of air through the air vents radially inwardly onto the commutator 28, brushes 31, and the peripheral surface of the armature assembly in order to cool these parts. The air which is drawn into the airflow path also comes into heat transfer contact with the stator, the motor housing 12 and the end shield 24 to effect reduction in temperature of these parts, especially the heat generating coils of the stator. In addition, any dust or metallic particles which may be accumulated at the commutator end of the motor will be drawn away from end shield 22 through the motor toward end shield 24 where accumulations of dust and metallic particles will not interfere with proper motor operation.

With reference again to FIGS. 1 and 2, in its illustrated form, an armature speed indicating means or assembly 50 includes an optical disc 52, a photo-cell 54 contained in a mounting block 56 and a light source 58 contained in a holder 60, each of which may be seen in greater detail in FIG. 3. The optical disc 52 is mounted on the armature shaft 30 by an arrangement which includes an expandable collet 62 and a collar 64 which upon being tightened down on the collet 62 will secure the collar and collet to the shaft 30. In addition, the collar includes an annular flange 66 to which the disc 52 is fastened by any suitable fastening means; e.g., a thermosetting epoxy resin or the like.

The optical disc 52 shown in detail in FIG. 3 comprises an annular glass disc having outer and inner opaque portions 68 and 70 defining an annular track 72 therebetween. The track includes a plurality of alternate opaque sections 74 and light transmitting sections or windows 76 therebetween, the opaque sections 74 normally being etched upon the glass by a well-known photographic etching process. In actual practice, the track includes two thousand opaque sections 74 and therefore also two thousand light transmitting sections or windows 76.

Still referring to FIG. 3, the photo-cell mounting block 56 may be seen in greater detail. The mounting block 56 in the exemplification was fabricated from a clear thermoplastic polyamide resin, but of course may also be fabricated from other suitable plastic or metallic materials. The mounting block includes several screw receiving holes 78 therein in order to enable it to be mounted on the outer face of the end shield 22 and an elongated groove 80 for receiving the photo-cell 54. The photo-cell 54 is normally placed in the groove and a suitable thermosetting epoxy resin applied thereto in order to permanently mount the photo-cell in the groove and to secure the lead connections.

Also shown in FIG. 3 is the light bulb or source holder 60 which in the exemplification is a generally tubular member having an opening 82 in the forward end thereof, and having a small light bulb 58 suitably fastened therein. In practice, a 0.875 watt light bulb having a relatively thin, straight filament 86 was used, and was fastened in the holder by a mounting plate 88 attached to the rear open end of the holder. The light bulb leads 89 extend through small, substantially air-tight openings in the plate 88. Mounted on the forward end of the holder, and covering the opening 82 is a grid plate 92, having a plurality of opaque sections 94 and light transmitting sections or windows 96 having the same dimensions as the opaque sections 74 and windows 76 in the track 72, and otherwise identical thereto.

In order to mount the holder 60 and the light bulb 58 contained therein adjacent the optical disc 52, and further to provide a substantially air-tight enclosure about the speed indicating assembly components to prevent the possibility of dust or other particles gathering on these components, a cover member 98 is mounted on the end shield in a rabbet or groove 100 provided especially for this purpose. The holder 60 is mounted in an opening 104 in the end of the cover member 98, and a set screw 107 is provided for adjusting the position of the holder. The cover member 98, as will be seen in FIGS. 1 and 2, is generally round to match the annular rabbet 100 and accurately dimensioned to tightly fit in this rabbet. In addition, mounting bolts 102 are provided to attach the cover member to the end shield 22. Thus, it will be appreciated that the modifications to the end shield 22 which are necessary in order to mount the speed indicating assembly thereon, as well as furnishing a satisfactory airflow path therethrough are relatively minor, involving only the machining of the rabbet 100, and the drilling of mounting holes for the cover mounting bolts 102 and the screw holes for the mounting block 56, and the provision of the air vents 44, 46 previously mentioned.

In order to enable external electrical connections to be readily made to the speed indicating assembly components and to the other motor components, and in order to provide additional protection for the speed indicating assembly 50, an enclosure member 106 is mounted on the end shield 22. The enclosure member 106 is located on a reduced end portion or seat 108 provided on the end shield 22, with the enclosure 106 conforming to the shape of the seat 108, which in this case is generally round. Thus, as will be seen in FIGS. 1 and 2, the enclosure member 106 encompasses or encloses the cover member 98 and the air vents 44 and 46, and is mounted on the seat 108 by mounting screws 109. In order to allow air to flow into the air vents 44 and 45, the enclosure member 106 includes a perforated section 110, having a plurality of air transmitting holes 112.

Two terminal boards 114 and 116 are mounted on the enclosure member 106 with a plurality of electrical mounting posts 120 having internal terminal sections extending into the interior of the enclosure member toward end shield 22. The various electrical components of the exemplified motor 10, such as the light bulb 58, the photocell 54, the brushes 31 and the field coils 18 and 20 are electrically connected to these internal terminal sections. It will be appreciated that external connections to the various motor and speed indicating assembly components may readily be made by means of external terminal sections of the boards 114, 116 which are exposed outwardly of enclosure member 106 and are quite accessible. Thus, the making of both internal and external electrical connections is greatly facilitated by this ararngement, especially since the terminal boards 114 and 116 have their mounting posts disposed in close proximity to the speed indicating assembly components as well as to other motor components. The connections of the various motor electrical and speed indicating assembly components to the terminal boards 114 and 116 may be better appreciated by referring to FIG. 4, wherein we have shown these circuit connections in schematic form.

Referring now to FIG. 5, we will explain in more detail the preferred method of assembling the motor 10 including the components of the speed indicating assembly 50. It will be appreciated, of course, that even slight inaccuracies in the mechanical mounting or positioning of the various speed indicating components will be greatly magnified when the electrical output of the photocell 54 is fed to a speed controlling circuit (not illustrated). The usual speed controlling circuit generally consists of a comparator circuit wherein a fixed or reference signal is compared to the output signal from the photo-cell 54 and the armature rotational speed adjusted accordingly. Thus, it will be appreciated that errors in the photo-cell output signal which may be engendered by eccentricities in the track 72 or excess axial movement or wobble of the optical disc 52 will affect the photo-cell output signal and preclude accurate control of the armature speed.

In order to eliminate such inaccuracies, the motor 10 is assembled in the following manner. Initially, the end shields 22 and 24 are mounted on the motor housing 12 while separately the optical disc 52 is mounted on the annular flange 66 of the mounting collar 64. The armature shaft 30 is located between the bearings carried in the end shields 22 and 24, with the ends of the shaft extending beyond the end shields exteriorly of the housing. The photo-cell 54 is mounted in the groove 80 in the mounting block 56, and the mounting block 56 is attached or mounted on the outer face of the end shield 22 by suitable mounting means such as machine screws or the like. The mounting collar 64 with the optical disc 52 mounted thereon is then assembled with the expandable collet 62 and the assembly slipped onto the end of the shaft 30. A shim 63 is placed between the photo-cell mounting block 56 and the disc 52 in order to maintaine a preselected spacing therebetween, which in practice is approximately 0.015 inch, for one application, a lock nut 65 is tightened down in order to affix the collet and collar to the shaft, and the shim is then removed.

At this time, the armature shaft 30 is rotated and, of course, the disc 52 rotates therewith. While rotating, the track is optically tested for eccentricity with respect to the center line of rotation of the shaft 30 and the disc 52. This optical test is carried out in actual practice by means of a microscope (not illustrated) having an aligning grid mounted on the eyepiece to enable small variations of movement of the track to be identified. No greater than 0.002 inch (or 2 mils) eccentricity of the track 72 can be tolerated. Stated otherwise, the distance between the outer line of the track and the center of rotation of the disc may not vary more than 2 mils during one revolution of the disc, since this may introduce undesirable errors in the signal output of the photo-cell 54. Thus, it has been found that in any given 90 degree rotation of the disc 52, either more or less than one quarter of the windows 76 (500 in the exemplification) will pass the photo-cell 54 when eccentricity of the track exists. Under such conditions, the photo-cell 54 will produce spurious output signals, and the speed control circuit will not be as accurate in its control of the speed of revolution of the armature.

Also at this time, the optical disc 52 is tested by means of a test device 71 for excessive axial movement during rotation. The test device 71 includes an arm 73 which is placed in contact with the disc 52 as the disc is rotated with the shaft 30. The arm 73 is connected to a piezo-electrical crystal (or a mechanical indicator, if desired) for converting mechanical movement to an electrical output, and hence the arm will pick up and the crystal will amplify any axial movement of the disc 52 during rotation. In practice, the maximum allowable axial movement of the disc 52 at the track 72 is 0.001 inch during one revolution of the disc. Excessive axial movement of the disc 52 will cause the level of illumination upon the photo-cell 54 to vary, which in turn will result in an improperly varying output signal from the photo-cell 54. Any mounting errors which are found at this time are, of course, corrected.

After the mounting of the disc 52 has been checked and corrected if needed, the cover member 98 is mounted in the machined rabbet 100 in the face of the end shield 22. The light bulb holder 60, which previously had the grid plate 92 mounted over the opening 82 in the front end thereof, is positioned in the opening 104 in the cover member 98. A removable plug 99 in the side of the cover member 98 is removed and a shim 75 is used to obtain between four to five mils (0.004 to 0.005 inch) distance between the grid plate 92 and the disc 52. At this time the grid windows 96 and the disc windows 76 are aligned. When the proper alignment and spacing between the disc 52 and grid plate 82 is achieved, the set screw 107 is tightened down in order to affix the holder in place in the cover member 98. The light bulb 84 is then mounted in the holder 60, with the filament thereof 86 aligned with the windows 96 in the grid plate, and the plate 88 attached to the holder 60 thereby completing the assembly of the speed indicating assembly 50, and providing a substantially dust free environment therefor during operation of the motor 10.

With the cover member 98 in place, the electrical leads from the various electrical components of the motor 10 are connected to their associated posts 120 at a common location inside the enclosure member 106 as shown in FIG. 4. After these electrical connections have been made, the enclosure member 106 is mounted on the end shield 22 thereby completing the assembly of the motor 10.

From the foregoing description of the preferred method of assembling the exemplified electric motor an improved air cooling or ventilating arrangement is provided for effectively and efficiently cooling the internal heat generating and transferring motor components, including the normally difficult to cool field windings and commutation parts. Further, an improved mounting arrangement for the speed indicating assembly 50 is provided, wherein the output of the assembly 50 is very accurate while being substantially protected from dust and metallic particles. The air cooling arrangement assists in insuring such dust and metallic particle protection by drawing in an efficient manner any particles away from assembly 50.

It should be apparent to those skilled in the art, while we have shown and described what at present is considered to be the preferred embodiment of my invention in accordance with the patent statutes, it is to be understood that modifications can be made without actually departing from the true spirit and scope of this invention, and we therefore intend to cover in the following claims all such equivalent variations as fall within the invention.

What we claim as new and desire to secure by Letters Patent of the United States is:

1. A method of assembling an electric motor having a housing and including a field, an armature assembly having a commutator and a shaft, a pair of end shields and a speed indicating assembly including an optical disc having an annular track including alternate opaque and light transmitting sections, a light source and a photo-cell; the method comprising the steps of: mounting the end shields on the motor housing and disposing the commutator between the end shields, with the end shields rotatably supporting the armature assembly; affixing the photo-cell on one end shield exteriorly of the housing; locating the optical disc on the shaft exteriorly of the housing at a preselected distance from the photo-cell, with the annular track being in overlying relationship relative to the photo-cell as the optical disc is being rotated with the shaft; aligning the disc on the shaft to ensure that there is no more than 2 mils eccentricity of the track with respect to the center of rotation of the disc and no more than 1 mil total axial movement of the track during rotation of the disc; attaching a cover member on the one end shield to enclose the disc and photo-cell; locating a light source having a grid plate including alternate opaque and light transmitting sections in the cover member; and aligning the opaque sections on the disc.

2. The method of claim 1 including the additional steps of electrically connecting at least the photo-cell and the light source to terminal sections of a terminal board carried on an enclosure member and mounting the enclosure member on the one end shield over the cover member.

3. A method of assembling an electric motor having a stationary assembly including a housing and a field winding, a rotatable assembly having a shaft, at least one end shield, an optical disc having a track including alternate opaque and light transmitting sections, a light source, and a photo-cell; the method comprising the steps of: mounting the at least one end shield on the motor housing with the at least one end shield rotatably supporting the rotatable assembly; affixing the photo-cell on the at least one end shield exteriorly of the housing; locating the optical disc on the shaft exteriorly of the housing at a preselected distance from the photo-cell, with the track being in overlying relationship relative to the photo-cell as the optical disc is being rotated with the shaft; aligning the disc on the shaft to provide no more than 2 mils eccentricity of the track with respect to the center of rotation of the disc and no more than 1 mil total axial movement of the track during rotation of the disc; attaching a first member to the at least one end shield adjacent the disc and photo-cell; locating a light source having a grid plate including alternate opaque and light transmitting sections in the first member; and aligning the opaque sections on the disc.

4. The method of claim 3 including the additional steps of electrically connecting at least the photo-cell and the light source to terminal sections of a terminal board carried on a second member and mounting the second member on the at least one end shield over the first member.

References Cited

UNITED STATES PATENTS

| 3,108,221 | 10/1963 | Peltola | 324—70 |
| 3,154,730 | 10/1964 | Houldin et al. | 318—313X |
| 3,231,807 | 1/1966 | Willis | 318—313 |

JOHN F. CAMPBELL, Primary Examiner

CARL E. HALL, Assistant Examiner

U.S. Cl. X.R.

310—66; 318—313; 324—175